United States Patent
Yu et al.

(10) Patent No.: US 10,489,381 B2
(45) Date of Patent: Nov. 26, 2019

(54) ADAPTIVE METADATA REFRESHING

(71) Applicant: SAP SE, Walldorf (DE)

(72) Inventors: Xia Yu, Shanghai (CN); Baolin He, Shanghai (CN); Chen Feng, Shanghai (CN)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 15/486,433

(22) Filed: Apr. 13, 2017

(65) Prior Publication Data

US 2018/0300367 A1    Oct. 18, 2018

(51) Int. Cl.
  *G06F 7/00*    (2006.01)
  *G06F 16/23*   (2019.01)
  *G06F 9/30*    (2018.01)

(52) U.S. Cl.
  CPC ...... *G06F 16/2365* (2019.01); *G06F 9/30083* (2013.01); *G06F 16/2308* (2019.01)

(58) Field of Classification Search
  CPC ............ G06F 16/2365; G06F 16/2308; G06F 9/30083; G06F 3/1217; G06F 11/2038; G06F 11/3423; G06F 9/3009; G06F 9/30123; G06F 2209/5018
  USPC ........................................ 707/704, 688, 802
  See application file for complete search history.

(56) References Cited

U.S. PATENT DOCUMENTS

| | | | |
|---|---|---|---|
| 6,591,266 B1* | 7/2003 | Li | G06F 16/9574 |
| 9,432,298 B1* | 8/2016 | Smith | H04L 49/9057 |
| 2002/0133491 A1* | 9/2002 | Sim | H04L 67/1008 |
| 2003/0074407 A1* | 4/2003 | Zhang | G06F 11/3672 709/205 |
| 2003/0093546 A1* | 5/2003 | Roy | H04L 12/1881 709/231 |
| 2005/0216503 A1* | 9/2005 | Charlot | G06Q 50/22 |
| 2006/0253548 A1* | 11/2006 | Vitanov | G06F 9/45537 709/217 |
| 2008/0134211 A1* | 6/2008 | Cui | G06F 9/52 719/318 |
| 2010/0257404 A1* | 10/2010 | Singh | G06F 11/0715 714/19 |
| 2011/0251997 A1* | 10/2011 | Wang | G06F 9/466 707/634 |
| 2013/0018919 A1* | 1/2013 | Peek | G06F 16/24549 707/780 |
| 2013/0060732 A1* | 3/2013 | Plasek | G06F 16/2308 707/609 |
| 2013/0073729 A1* | 3/2013 | Yun | G06F 11/302 709/225 |

(Continued)

*Primary Examiner* — Mohammed R Uddin
(74) *Attorney, Agent, or Firm* — Fish & Richardson P.C.

(57) ABSTRACT

Techniques are described for managing the optimized refreshing of metadata associated with online and live systems. In some implementations, a set of metadata modules associated with one or more entities are identified, the metadata modules defining metadata associated with a particular data model for the associated entities. A request to initiate a refreshing of the metadata for a subset of the set of metadata modules is identified. Each metadata module from the subset of the set of metadata modules is prioritized into a prioritization order. A determination is made as to whether two or more idle database connections are available. In response to determining that two or more idle database connections are available, a concurrent refresh of the subset of the set of metadata modules is initialized in the prioritization order.

18 Claims, 4 Drawing Sheets

(56) References Cited

U.S. PATENT DOCUMENTS

| | | | |
|---|---|---|---|
| 2014/0047079 A1* | 2/2014 | Breternitz | G06F 9/5072 |
| | | | 709/220 |
| 2014/0181036 A1* | 6/2014 | Dhamankar | G06F 16/24568 |
| | | | 707/648 |
| 2014/0188814 A1* | 7/2014 | Venkatrao | G06F 16/252 |
| | | | 707/689 |
| 2014/0208330 A1* | 7/2014 | Pusukuri | G06F 9/4881 |
| | | | 718/104 |
| 2015/0026213 A1* | 1/2015 | Hegde | G06F 16/24552 |
| | | | 707/781 |
| 2016/0306827 A1* | 10/2016 | Dos Santos | G06F 16/25 |
| 2017/0192998 A1* | 7/2017 | Sergeev | G06F 16/1744 |

* cited by examiner

ADAPTIVE METADATA REFRESHING

BACKGROUND

The present disclosure relates to a system and computerized method for managing the optimized refreshing of metadata associated with online and live systems.

Many systems have metadata, especially for Web Service APIs (application programming interfaces). The backend data model structure for such systems may change from time to time or on a regular basis. In order for live applications to access the available data correctly, the metadata associated with the systems must be updated in a timely fashion to allow users and applications to correctly access and interact with the system's data structure and data values.

SUMMARY

Implementations of the present disclosure are generally directed to managing the optimized refreshing of metadata associated with online and live systems. In one example implementation, a computerized method executed by hardware processors can be performed. The example method can comprise identifying a set of metadata modules associated with one or more entities, the metadata modules defining metadata associated with a particular data model for the associated entities. A request to initiate a refreshing of the metadata for a subset of the set of metadata modules is identified. Each metadata module from the subset of the set of metadata modules is prioritized into a prioritization order. A determination is made as to whether two or more idle database connections are available. In response to determining that two or more idle database connections are available, a concurrent refresh of the subset of the set of metadata modules is initialized in the prioritization order.

Implementations can optionally include one or more of the following features. In some instances, in response to determining that only one idle database connection is available, a single thread refresh of the subset of the set of metadata modules is initiated. In those instances, the single thread refresh of the set of metadata modules comprises a sequential processing of metadata modules in the subset of the set of metadata modules.

In some instances, prior to determining whether two or more idle database connections are available, the method includes determining whether a set of system resource metrics satisfy a concurrent refresh threshold, and, in response to determining the set of system resource metrics do not satisfy the concurrent refresh threshold, a single thread refresh of the subset of the set of metadata modules is initiated. In those instances, the concurrent refresh threshold may include at least one of a particular current CPU usage amount threshold and a current available memory threshold, wherein the current available memory threshold represents an available memory greater than the required memory associated with the concurrent refresh.

In some instances, initiating the concurrent refresh of the subset of the set of metadata modules comprises determining a CPU core number, C, of a particular set of servers to perform the refresh and determining the number of idle database connections, #CONN, at the particular set of servers. In response to determining that C is less than or equal to #CONN, a concurrent refresh of the subset of the set of metadata modules using #CONN threads at the particular set of servers is performed, while in response to determining that C is greater than #CONN, a concurrent refresh of the subset of the set of metadata modules using C+1 threads at the particular set of servers is performed.

In some instances, the request to initiate a refreshing of the metadata for a subset of the set of metadata modules comprises one of a manual request by a particular user to initiate the refreshing of the metadata, an automatic request to initiate the refreshing of the metadata in response to the expiration of a cache associated with the metadata modules, an automatic request to initiate the refreshing of the metadata in response to a determination that at least one entity associated with at least one of the metadata modules has been updated, and an automatic request to initiate the refreshing of the metadata in response to a determination that at least one new entity is newly added.

In some instances, prioritizing each metadata module from the subset of the set of metadata modules into a prioritization order comprises prioritizing the metadata modules in a descending order based on an average refresh time for each of the metadata modules. In those instances, at least one metadata module in the subset of the set of metadata modules is associated with a relatively higher priority, where the relatively higher priority is distinct from the average refresh time of the at least one metadata module. In such instances, the at least one metadata module is provided a relatively higher priority in the prioritization order than metadata modules having a relatively longer average refresh time than the at least one metadata module. In some instances, the average refresh time for each metadata module is calculated based on metrics calculated for a predetermined number of prior refresh times for each metadata module.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
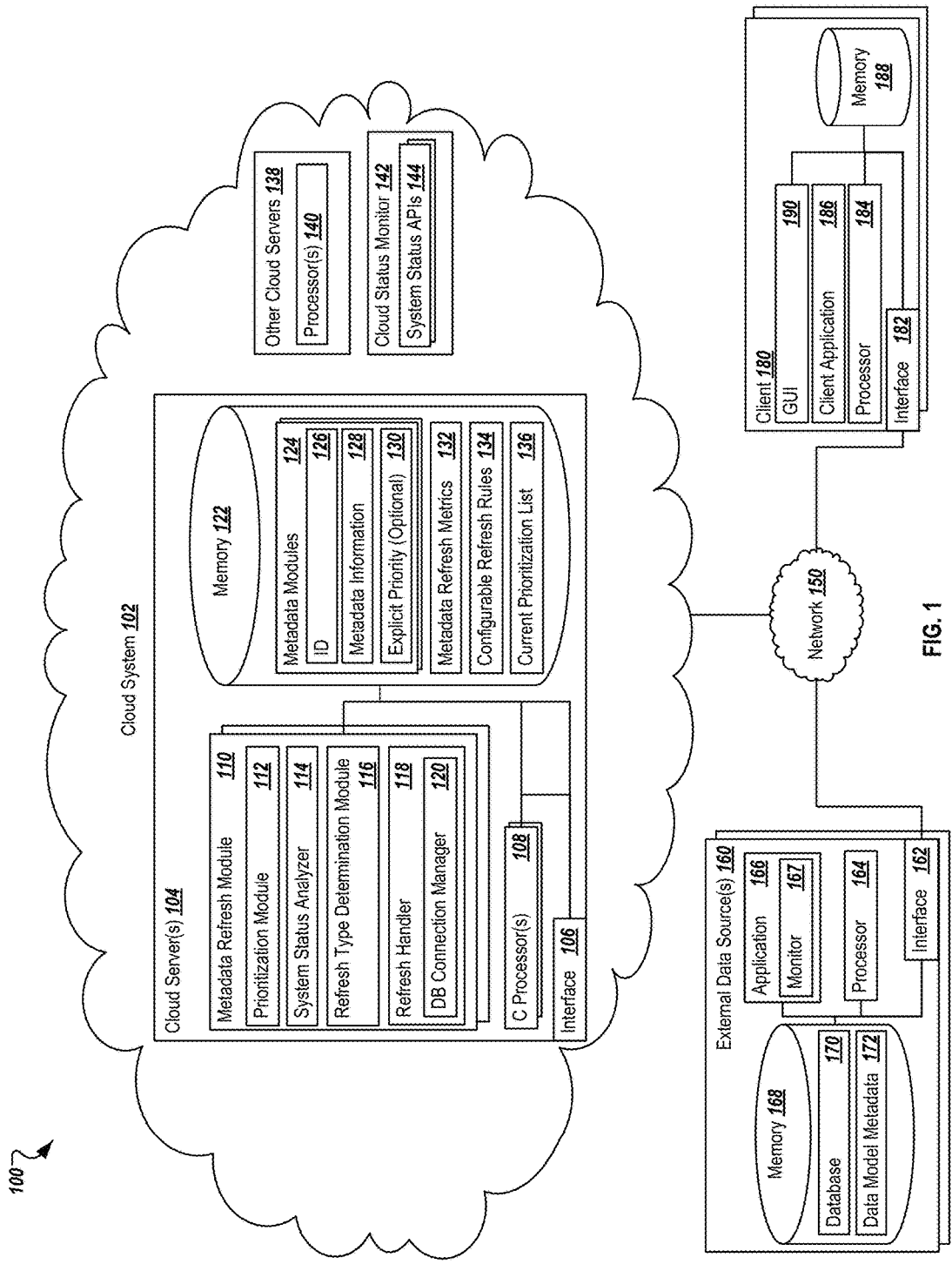
FIG. 1 is a block diagram illustrating an example system for implementing an optimized concurrent metadata refresh process.

The present disclosure describes systems and methods for managing the optimized refreshing of metadata associated with online and live systems, such as those associated with a Web Service API, as well as any computer system or application that is associated with underlying metadata for accessing backend objects. As described, the backend data model structure for a database or data set associated with the Web Service API or other systems can be updated or modified by administrators or users at various times. Fields or properties can be added, removed, and/or modified—in such instances, associated APIs or other components attempting to access the system must know the particulars of the backend data model structure in order to fully access and interact with the data and its particulars. For example, if a field or property is added for an entity and the metadata is not refreshed, future queries to the entity may not return the new field or property until the metadata is updated, providing users with incomplete sets of data. If a field or property is deleted for a particular entity and the metadata is not refreshed, queries to the entity may provide erroneous or redundant data for the now deleted field or property. The problem can be further exasperated when an insert or update operation is performed. Without refreshing the metadata, data for deleted fields or properties can be provided erroneously, while no data associated with newly added fields or properties may be returned, thereby leading to dirty and incorrect data within the system.

When entire entities are added or deleted, further problems may be seen. For example, if a newly added entity is added to the data model structure, existing queries based on an outdated set of metadata will not return the newly added entity. Conversely, where an entity is removed or deleted, customers or applications may obtain responses including data from the new deleted entities where no data should be returned.

Refreshing metadata is an important and necessary task to be performed on a regular interval, as well as in response to system events and/or user triggering. In many current systems, hundreds or thousands of entities may exist in systems. In current systems, updating metadata entities or modules is performed sequentially in a one-by-one process, where the time required to perform the entirety of the metadata update equals the full sum of the time to refresh each individual entity's metadata. While individual entities may only take a very short time to refresh, the refreshing of a large number of entities can cause system slowdowns and resource depletion. Considered along with the network transmission time, end-to-end scenarios for metadata refreshing can cause inconvenient system performance and timing for users and their applications/systems.

The present disclosure describes a dynamic method for performing metadata refresh, wherein the type of refresh (e.g., concurrent or single thread) can be determined based on the current status and situation of the servers available to perform the refresh (e.g., cloud and/or on-premise servers), as well as the details related to the implementation of the concurrent refresh, where available (e.g., number of threads available to perform the refresh). Using such a dynamic solution, the performance and timing of the metadata refresh can be greatly improved.

In the present solution, two types of refresh are available and are selected dynamically at refresh-time: a single thread refresh (i.e., using a single thread to process each metadata refresh) and a concurrent refresh (i.e., which uses multiple threads to process the metadata of various entities and/or metadata modules concurrently). In some instances, multiple system metrics and available resources are dynamically considered at the time of the refresh. Such system metrics can include, for example, a current CPU usage, a current memory usage, and a number of available database connections. Other dynamic considerations may also be brought into the evaluation, including user- or administrator-specific concurrent refresh rules and parameters.

In general, the solutions provided herein can provide up to a 200% improvement in refresh performance. Currently, the time of a single thread refresh is the sum of each refresh time $T_i$, or $T_1+T_2+ \ldots T_n$. In contrast, the concurrent thread refresh time using the present solution is ideally the maximum of $\{T_i T_{2m-i+1}+T_{2m+i}+T_{4m-i+1}+ \ldots \}$, i=1, 2, ... m. However, in some extreme situation, $T_1$ may be greater than the sum of all other refresh times such that the execution time is $T_1$.

Turning to the illustrated implementation, FIG. 1 is a block diagram illustrating an example system 100 for implementing an optimized concurrent metadata refresh process. As illustrated in FIG. 1, system 100 is associated with a cloud-based system capable of sharing and communicating information across devices and systems (e.g., cloud system 102 or individual cloud servers 104, external data sources 160, and client 180, among others, via network 150). In some implementations, only a single cloud server 104 may available in the cloud system 102, while in others multiple cloud servers 104, 138 may be available and used for the metadata refresh process. In some instances, while multiple servers 104, 138 may be included in the system, only a subset of the processors 108, 140 (or portions of their respective CPU cores) associated with those servers 104, 138 may be available to perform the refresh processing. In some instances, non-cloud-based systems, such as on-premise systems, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, cloud server 104, external data source 160, and/or client 180 may be any computer or processing device such as, for example, a blade server, general-purpose personal computer (PC), Mac®, workstation, UNIX-based workstation, or any other suitable device. Moreover, although FIG. 1 illustrates a plurality of cloud servers 104, the cloud system 102 can be implemented using a single system or more than those illustrated, as well as computers other than servers, including a server pool. In other words, the present disclosure contemplates computers other than general purpose computers, as well as computers without conventional operating systems. Similarly, the client 180 may be any system which can request data and/or interact with the cloud system 102 and external data sources 160. The client device 180, in some instances, may be a desktop system, and client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

The cloud system 102 may be associated with the management and operations of one or more applications and/or application programming interfaces (APIs) for receiving queries associated with one or more data sources, including external data sources 160. The cloud system 102 may manage the execution or interpretation of queries from users and applications based on the existing or updated metadata information about those existing systems and entities. For the specifics of the present disclosure, the cloud system 102 and its respective cloud servers 104, 138 can provide the processing power (i.e., processors 108, 140) and threads to perform the metadata refreshing to ensure that accurate queries and presentations of information are performed for users and applications.

As illustrated, one or more cloud servers 104, 138 can be included in the cloud system 102. Cloud system 102 may also be associated with or a part of network 150 in some instances. The processors 108, 140 of the cloud system 102 and its various servers 104, 138 can be shared to allow for improved processing and processing power. While illustrated as servers, the components on the cloud system 102 may be non-server systems, including individual processors on non-server computers.

As illustrated, example cloud server 104 includes interface 106, one or more processors 108, a metadata refresh module 110, and memory 122. The interface 106 is used by the cloud server 104 for communicating with other systems in a distributed environment—including within the environment 100—connected to the cloud system 102 and/or network 150, e.g., the external data sources 160, client 180, other cloud servers 104, 138, as well as other systems communicably coupled to the cloud system 102 and/or network 150. Generally, the interface 106 comprises logic encoded in software and/or hardware in a suitable combination and operable to communicate with the cloud system 102 and/or network 150. More specifically, the interface 106 may comprise software supporting one or more communication protocols associated with communications such that the cloud system 102, network 150, and/or interface's hardware is operable to communicate physical signals within and outside of the illustrated environment 100. Still further, the interface 106 may allow the cloud server 104 to communicate with the external data sources 160 to access updated information related to the database model metadata 172 associated with particular metadata modules 124 as described in the present disclosure.

Network 150 facilitates wireless or wireline communications between the components of the environment 100 (e.g., between the cloud servers 104 and the external data sources 160), as well as with any other local or remote computer, such as additional mobile devices, clients (e.g., client 180), servers, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components (e.g., the cloud system 102) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN). Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

The cloud server 104 also includes one or more processors 108. Although illustrated as multiple processors 108 in FIG. 1, a single processor may be used according to particular needs, desires, or particular implementations of the environment 100. Each processor 108 may be a central processing unit (CPU), an application specific integrated circuit (ASIC), a field-programmable gate array (FPGA), or another suitable component. Generally, the processor 108 executes instructions and manipulates data to perform the operations of the cloud server 104, in particular those related to refreshing metadata modules 124. Specifically, the processors 108 execute the algorithms and operations described in the illustrated figures, as well as the various software modules and functionality, including the functionality for sending communications to and receiving transmissions from clients 180 and external data sources 160, as well as to other devices and systems. Each processor 108 may have a single or multiple core, with each core available to host and execute an individual processing thread. To perform the concurrent refreshing as described herein, multiple cores are available within the cloud server 104 and/or the cloud system 102 and its other servers 138 and/or processors available.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Using the processors 108, the cloud server 104 can execute various applications and processes, including those illustrated in FIG. 1. While the cloud server 104 may be capable of performing various other tasks, the present disclosure is directed to the cloud server's refreshing of metadata relating to one or more data sources or entities to which queries are executed from, either by the cloud server 104 or a related system that uses the metadata refreshed by the cloud server 104. As such, a metadata refresh module 110 is executed by the cloud server 104 to perform the functionality associated with the refresh process.

The metadata refresh module 110 is used to identify and update metadata defined in a plurality of metadata modules 124, such as those stored in memory 122. Metadata modules 124 can be single or groups of metadata defining or associated with one or more entities. Each metadata modules 124 can include an identifier (ID) 126 identifying the corresponding entity or data structure to which it refers. Individual entities may describe particular target objects. Metadata modules 124 may combine related entities into a single metadata file or module. For example, a module called "Employee_Simple" may include entities such as Personal- _Information, Job_Entity, Employment_Information, Home_Address, and other related entities. As that information is closely related, modulating the entities allows for a close connection between the information that may be requested or used in related searches or other operations. Additional information about the particular entity or data structure may be provided to allow users and/or other applications to clearly identify the corresponding data source or data set, such as a particular address or location of the metadata to be used in refreshing the data. Further, the metadata modules 124 are associated with a set of metadata information 128 that defines the data model structure of the underlying data set, allowing queries associated with the underlying data structure or set to accurately match the current data model and access the full, current data set. When metadata for the particular data source or data set is incorrect, queries and interactions to the backend source may miss data, request non-existent data, or otherwise provide erroneous or incomplete query results. In some instances, metadata modules 124 may be associated with a particular explicit priority indication 130. In prioritizing refresh actions, this explicit priority indication 130 may be used to treat a particular metadata module 124 with a relatively higher priority than would normally be provided as described below. Not all metadata modules 124 may be associated with an explicit priority indication 130, and such indications may be based on a user- or administrator-level selection or flagging of particular metadata modules 124 as of higher priority as compared to other modules. In some instances, different levels of relative priority may be identified to allow for distinction between priority types or levels of particular modules 124. In some instances, the priority indication 130 may be determined based on rules or dynamic determinations that identify a particular metadata module 124 as a higher priority module in comparison to other modules. Still further, some metadata modules 124 associated with mission-critical or other high important data sets may, by default, be initially assigned a priority indication. Any such automatic indications may be modified at a later time by a user or administrator as appropriate.

As illustrated, the metadata refresh module 110 includes a plurality of submodules or agents, including a prioritization module 112, a system status analyzer 114, a refresh type determination module 116, and a refresh handler 118. The various illustrated submodules may be components within the metadata refresh module 110, or may be integral to the module 110 and simply part of its functionality.

The prioritization module 112 can perform analyses of particular metadata modules 124 to be refreshed and assist in the prioritization of their refresh within a refresh queue or ordering system. In general, modules 124 may be prioritized according to their respective refresh execution time. The longer the execution time of a particular metadata module 124, the higher its relative priority. By doing so, the whole execution time may be made as short as possible. For example, for modules $M_1$ and $M_2$, execution times for the refresh may be $T_1$ and $T_2$, respectively, where $T_1 > T_2$. Since $T_1 > T_2$, then the priority of module $M_1$ ($P_1$) is relatively higher than the priority of $M_2$ ($P_2$), or $P_1 > P_2$. The prioritization module 112 or another suitable component may monitor and store information on the relative refresh times. In such instances, initial refresh times within a system may be set to 0. Using a warm-up period for the refreshing, the average refresh time over a set number, n, of iterations can provide metric information related to the refresh times, which can be store in the metadata refresh metrics 132 of memory 122. These average refresh times and/or at least some of the historical calculations can be maintained in memory 122 or elsewhere and can be used to determine the refresh time-based priority. The prioritization module 112 can use that prior to each refresh to generate a prioritization order for the particular metadata modules 124 being refreshed. As noted above, at least some of the metadata modules 124 may be associated with an explicit priority indication 130. In such instances, the modules 124 associated with the priority indication 130 can be prioritized above those with relatively slower refresh times, where appropriate. Once the prioritization is complete, a current prioritization list 136 can be generated, made available, and/or otherwise used to manage the order of the refresh. The current prioritization list 136 can be a serialized list of refresh tasks to be performed based on the prioritization information, where, in a concurrent refresh system, two or more of the tasks may be performed in a concurrent refresh process.

A system status analyzer 114 of the metadata refresh module 110 can perform operations to determine the current status of the system, cloud server(s) 104, and the cloud system 102. The analyzer 114 can perform API calls and system analyzes to determine the dynamic status of the system resources at a particular time prior to refresh. In some instances, a set of configurable refresh rules 134 may be available that can determine requirements of the system to allow a concurrent refresh to occur. Those requirements may include particular thresholds within which the system must be in order to perform the concurrent refresh, including a current CPU usage, a current available CPU core amount, a number of available CPU cores, an available memory amount, a number of available database connections ("DB connections"), or any other suitable and relevant data. Such live information can be used at the time of a refresh workflow process to determine if and how to proceed. In some instances, the system status analyzer 114 may access one or more external systems or tools to identify the system's status, including for example a cloud status monitor 142. The cloud status monitor 142 may be any tool or agent that can be used to measure and return at least a portion of the status information for a cloud or other server system. For example, the cloud status monitor 142 may include or be associated with one or more system status APIs 144 capable of accessing and/or calculating information on current loads and usages on the system and/or individual systems, services, or components thereof.

A refresh type determination module 116 can be used to determine, based on the output of, e.g., the system status analyzer, (1) whether a single thread refresh or a concurrent thread refresh is to be used and, (2) if the concurrent thread refresh is to be used, the specifics of the particular concurrent refresh. The refresh type determination module 116 can perform checks, based on the configurable refresh rules 134, to determine whether the system conditions and status allows for a concurrent refresh. For example, if the configurable rules require less than 90% CPU usage and available memory for a refresh being higher than the required memory for the refresh, the refresh type determination module 116 can identify whether all required parameters for a concurrent refresh are met. If not, the refresh type determination module 116 can perform a single thread refresh, where the modules are sequentially refreshed based on the current prioritization list 136. If, however, the requirements are met, then the refresh type determination module 116 can determine the parameters of the particular concurrent refresh. In particular, the number of CPU cores and the idle DB connections available in the system or at the cloud server 104 are identified based on information collected from the prior system analysis. Additionally, more than one idle DB connection must be available to allow for a concurrent refresh. If the number of idle DB connections available, #conn, is greater than the number of CPU core number of the server, C, then a concurrent refresh session with C+1 threads can be executed to concurrently run the metadata refresh. If #conn is less than or equal to C, but #conn is greater than 1, then a concurrent refresh session with #conn threads is to be executed.

The information about the type of refresh can, in some instances, be provided to a refresh handler 118 for performing the refresh operations. The refresh handler 118 can initialize the determined type of refresh (i.e., single thread or concurrent thread) by reserving the resources required to perform the action (i.e., particular CPU cores, DB connections, etc.). The refresh handler 118 may include or be associated with a DB connection manager 120 that can be used to allow the DB connections to identify and connect to the appropriate external data sources 160 (or, in some instances, internal data sources) for the metadata refresh. For single thread refreshing, the refresh handler 118 can cause a sequential refresh of the metadata modules 124 in the order as defined in the current prioritization list 136. For concurrent thread refreshing, a general queue may be formed in the order of the current prioritization list 136. The refresh handler 118 can then add individual metadata modules 124 into particular threads from the queue based on that order. When a thread opens, or in some cases, while the thread is processing, another metadata module 124 from the list 136 can be provided to the threads for processing.

Memory 122 of the cloud server 104 may represent a single memory or multiple memories. The memory 122 may include any memory or database module and may take the form of volatile or non-volatile memory including, without limitation, magnetic media, optical media, random access memory (RAM), read-only memory (ROM), removable media, or any other suitable local or remote memory component. The memory 122 may store various objects or data (e.g., the metadata modules 124, metadata refresh metrics 132, configurable refresh rules 134, current prioritization list 136, etc.), including financial data, user information, administrative settings, password information, caches, applications, backup data, repositories storing business and/or dynamic information, and any other appropriate information associated with the cloud server 104 including any parameters, variables, algorithms, instructions, rules, constraints, or references thereto. Additionally, the memory 122 may store any other appropriate data, such as VPN applications, firmware logs and policies, firewall policies, a security or access log, print or other reporting files, as well as others.

As illustrated and previously mentioned, one or more additional cloud servers 138 may be available to host threads associated with the metadata refresh where one or more of their CPU cores associated with their one or more processors 140 are available at the time of the refresh. As the cloud system 102 allows for distributed processing, a load balancer (not shown) may be used to manage the load provided to any particular system, processor 108, 140, or cores of those processors 108, 140.

The external data sources 160 illustrated in FIG. 1 may be any suitable data source, including Web services, databases, spreadsheets, applications with a defined metadata schema, or any other suitable source. The metadata modules 124 may be associated with particular ones of the external data sources 160 (or various parts of the same external data sources 160 where such modulation is available). The external data sources 160 may be a full system or server, a particular program or resource within an external system from the cloud system 102, a database, or a component or data source located within or part of the cloud system 102.

Each external data source 160 may be associated with an application 166, but is not required to do so. The application 166 may be a Web service or other applications capable of interacting with the underlying database 170, e.g., where queries may be received and processed within the external data source 160 and executed on the database 170. Database 170 may be a relational database, in-memory columnar database, spreadsheet, or any other source with a defined data model. In some instances, memory 168 of the external data source 160 may include a database 170 and a set of data model metadata 172 defining the structure of the database 170. In some instances, the metadata 172 may be explicitly defined, while in others the metadata 172 may be implicitly identified based on an analysis of the database 170. Memory 168 may be similar to or different from memory 122. Communication with the external data source 160 may be via an interface 162, which may be similar to or different from interface 106. The application 166 and/or other functionality of the data source 160 may be executed by the processor(s) 164, which may be similar to or different from processor 108. In some instances, the application 166 may include a monitor 167, which may be an agent or other module of the application 166 or of the metadata refresh module 110 which can determine when particular changes to an underlying database 170 and its associated data model structure occur within the external data source 160. In response to determining a change has occurred that may affect the data model and the associated metadata, the monitor 167 may report or send a notification to the metadata refresh module 110, where a refresh for at least the associated external data source's 160 associated metadata module 124 is triggered.

As illustrated, one or more clients 180 may be present in the example system 100. Each client 180 may be associated with requests received by the cloud system 102 related to the one or more data sources 160 and which request data associated with those data sources, where those requests and queries require knowledge and current information related to the metadata of each data source 160. As illustrated, the client 180 may include an interface 182 for communication (similar to or different from interface 106), a processor 184 (similar to or different from processor 108), a client application 186, memory 188 (similar to or different from memory 122), and a graphical user interface (GUI) 190.

The illustrated client 180 is intended to encompass any computing device such as a desktop computer, laptop/notebook computer, mobile device, smartphone, personal data assistant (PDA), tablet computing device, one or more processors within these devices, or any other suitable processing device. In general, the client 180 and its components may be adapted to execute any operating system, including Linux, UNIX, Windows, Mac OS®, Java™, Android™, or iOS. In some instances, the client 180 may comprise a computer that includes an input device, such as a keypad, touch screen, or other device(s) that can interact with the client application 186, and an output device that conveys information associated with the operation of the applications and their application windows to the user of the client 180. Such information may include digital data, visual information, or a GUI 190, as shown with respect to the client 180. Specifically, the client 180 may be any computing device operable to communicate queries or communications to the cloud system 102, external data sources 160, other clients 180, and/or other components via network 150, as well as with the network 150 itself, using a wireline or wireless connection. In general, client 180 comprises an electronic computer device operable to receive, transmit, process, and store any appropriate data associated with the environment 100 of FIG. 1.

GUI 190 of the client 180 interfaces with at least a portion of the environment 100 for any suitable purpose, including generating a visual representation of the client application 186. In particular, the GUI 190 may be used to present results of queries associated with one or more external data sources 160. GUI 190 may also be used to view and interact with various Web pages, applications, and Web services located local or external to the client 180. Generally, the GUI 190 provides the user with an efficient and user-friendly presentation of data provided by or communicated within the system. The GUI 190 may comprise a plurality of customizable frames or views having interactive fields, pull-down lists, and buttons operated by the user. For example, the GUI 190 may provide interactive elements that allow a user to view or interact with information related to the operations of processes associated with the cloud system 102. In general, the GUI 190 is often configurable, supports a combination of tables and graphs (bar, line, pie, status dials, etc.), and is able to build real-time portals, application windows, and presentations. Therefore, the GUI 190 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
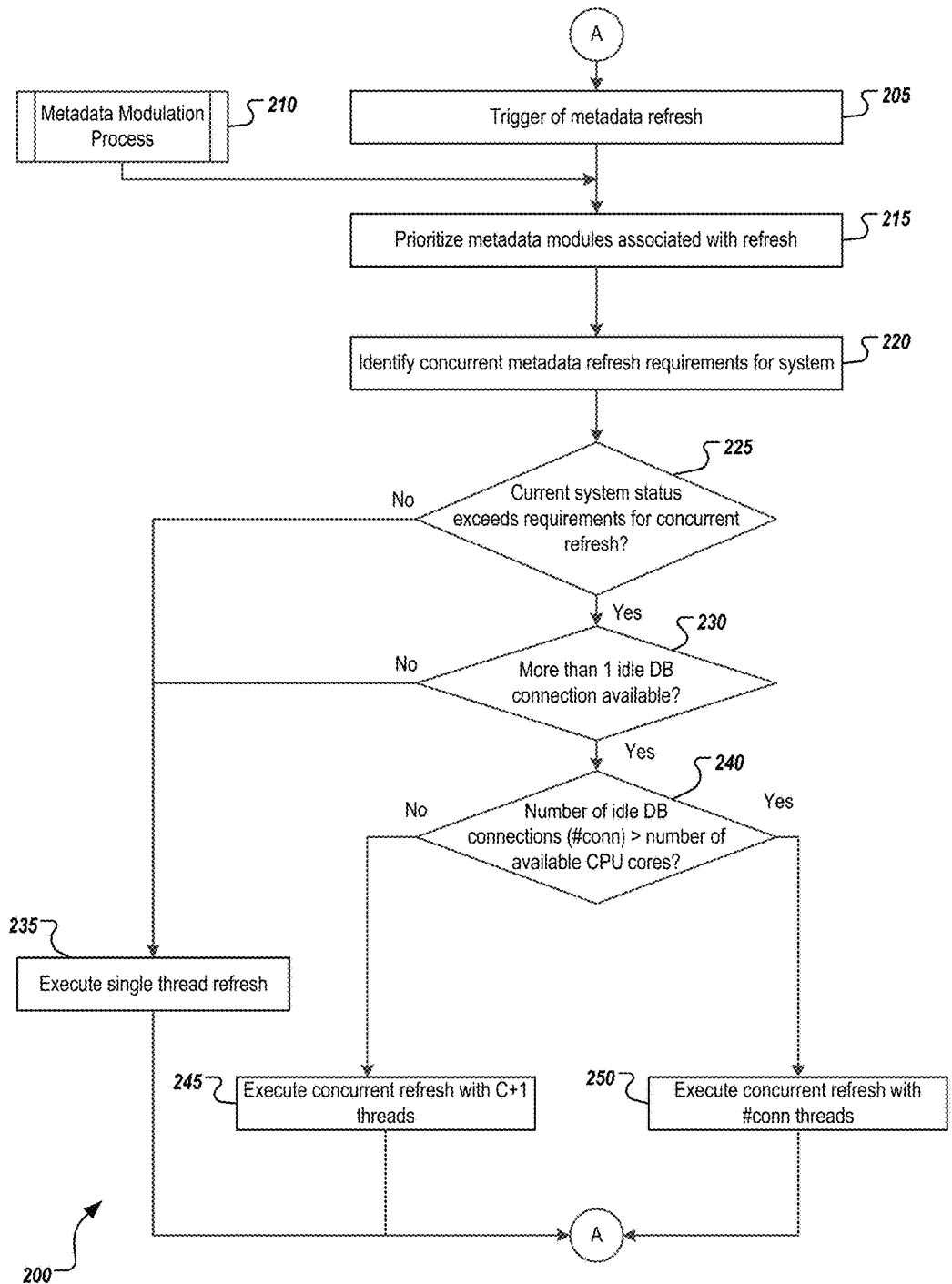
FIG. 2 represents an example flow for concurrently refreshing metadata associated with a plurality of modules.

FIG. 2 represents an example flow for concurrently refreshing metadata associated with a plurality of modules. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

At 205, a triggering of a metadata refresh occurs and is identified by a cloud server or a suitable system managing the refresh of the associated metadata. The triggering may occur in response to a particular event or input, an explicit request from a user or administrator, an expired cache storing the metadata, a determination that one or more entities, parameters, or properties associated with a particular data source have changed, a programmed update included in executing code associated with an application, or any other suitable trigger. In some instances, only a subset of the metadata modules may be refreshed, such as when changes to backend databases cause only a subset of modifications and refreshes to be needed, or where only specific sets of metadata are in need of refreshing.

At 210, which may occur concurrently with 205, prior to 205, or at any other suitable time, a metadata modulation process may occur. The metadata modulation process may associate one or more sets of metadata associated with related data sources or entities, such that refreshing of particular metadata modules may refresh related metadata sets (e.g., at a single location, used for a single application or purpose, etc.). The metadata sets can be grouped into small modules according to database relationships and business logic, as needed. Additionally, new entities may be registered upon creation such that new modules are created or existing modules are updated to include the newly registered entities or data sources.

At 215, the set of metadata modules to be refreshed are prioritized. As described previously, metadata modules may be previously calculated to have an average refresh execution time based on prior refreshing. For general prioritization, the modules can be ordered in a descending order based on the length of the average refresh time. In doing so, the slowest metadata modules can be handled initially while the potentially concurrent process allows faster modules to be processed concurrently to the relatively slower modules. Further, some metadata modules, based on their business value and/or criticality, may be explicitly identified as high priority modules. In such instances, those explicitly higher priority modules can be prioritized first before considerations of relative refresh times are considered. Alternatively, a weighted analysis may be used, where appropriate. Other means of prioritizing the metadata modules to be refreshed can also be used.

At 220, a set of requirements within the system for performing a concurrent metadata refresh process may be identified. The requirements may be hardcoded requirements or they may be user- or admin-configurable. Example requirements may include a particular percentage of current CPU usage, an absolute or relative amount of memory available for the process, as well as any other suitable parameters. In some instances, the requirements may be dynamic, or may shift based on recent or current conditions, as well as on recent historical system status information. At 225, a determination is made as to whether the current system status exceeds the concurrent refresh requirements. The current system status may be determined by a system monitor, calls to one or more status-related APIs which return status information, or any other suitable determination. If a determination is made that the requirements are not met, method 200 continues at 235, where a single thread refresh is executed using a single thread to sequentially perform the refresh process. If, however, the requirements are satisfied, method 200 continues at 230. At 230 a determination is made as to whether more than one (1) idle database connection is available (or another number greater than one as defined by the concurrent refresh requirements). If only one database connection is available, only one metadata module can be refreshed at a time such that method 200 continues at 235 to perform the single thread refresh. If, however, more than one idle database connection is available, method 200 continues to 240.

At 240, a determination is made regarding the relative number of idle database connections, or #conn, and the number of available CPU cores, C, which determines the number of possible threads for processing. If the #conn is greater than C, then method 200 continues at 245 where a concurrent refresh using C+1 threads is executed. In such a situation, the first C+1 modules in the prioritized list are each sent to the threads for refreshing. As a particular module is completed, a new module is sent to the available thread for processing. In some instances, one or more of the modules may be assigned to a particular thread prior to the previous module's update being completed. If, however, #conn is less than or equal to C, method 200 continues at 250 where a concurrent refresh using a number of threads equal to #conn, the number of idle database connections, is executed.

Upon completion of the refreshing, method 200 can wait for a new triggering action or event to occur, whereby the process occurs again based on the particular set of metadata modules being refreshed.

Figure 3:
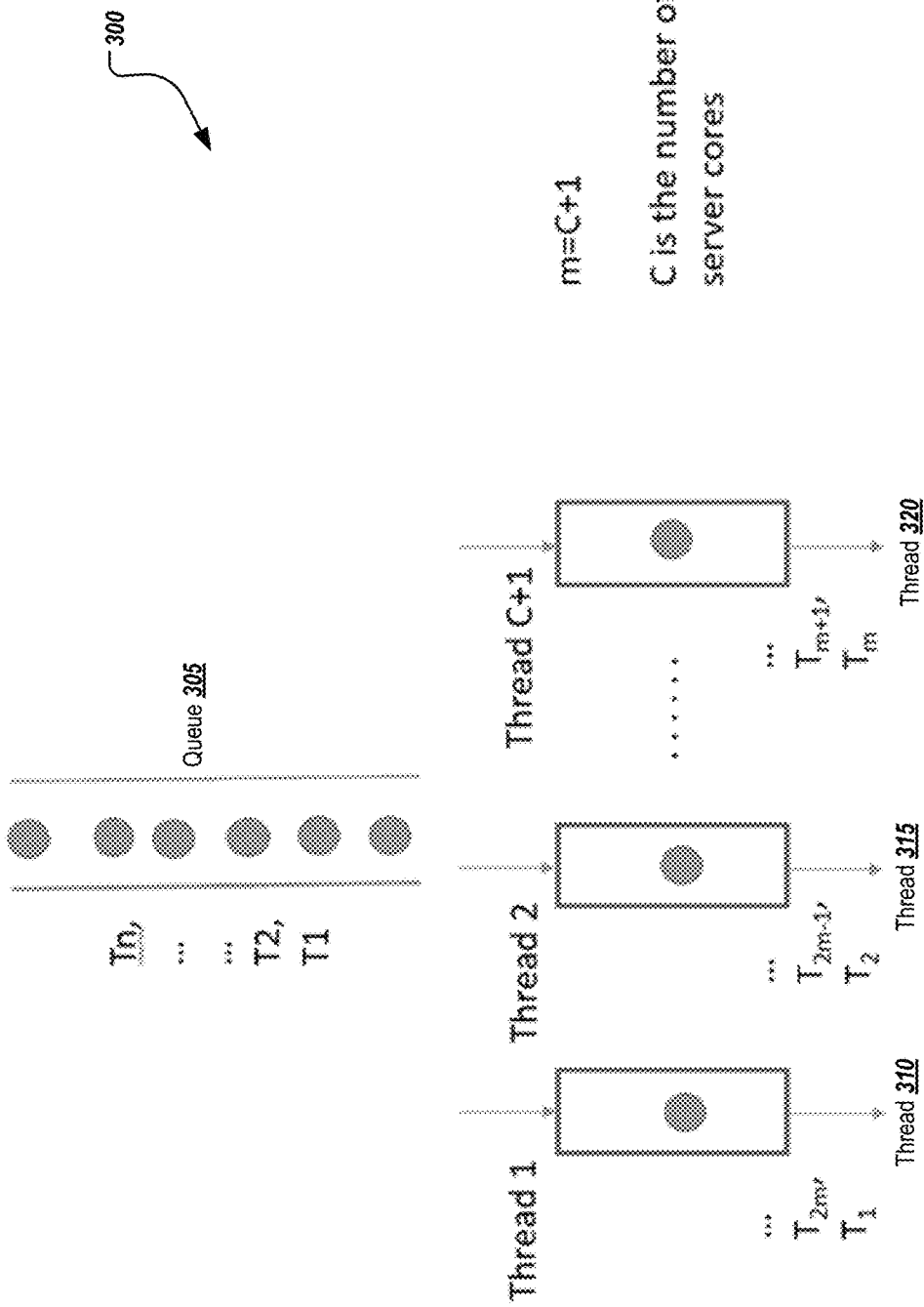
FIG. 3 is an example illustration of a workflow for concurrent thread metadata refresh where the idle number of database connections, #conn, is greater than the number of CPU cores, C, in one or more systems performing the refreshing.

FIG. 3 is an example illustration 300 of a workflow for concurrent thread metadata refresh where the idle number of database connections, #conn, is greater than the number of CPU cores, C, in one or more systems performing the refreshing. As noted, during the determination of the thread numbers, the number of connections is greater than the number of CPU cores for refresh processing. In such instances, the number of threads is C+1. For example, if two (2) CPU cores are available, three (3) threads will be created, shown as thread 310, 315, and 320. A queue 305 stores the prioritized set of metadata modules to be refreshed. Upon instantiated the threads, those metadata modules are provided to particular threads for execution in a concurrent manner. As particular refreshes are completed, new modules are provided to the now available thread.

Figure 4:
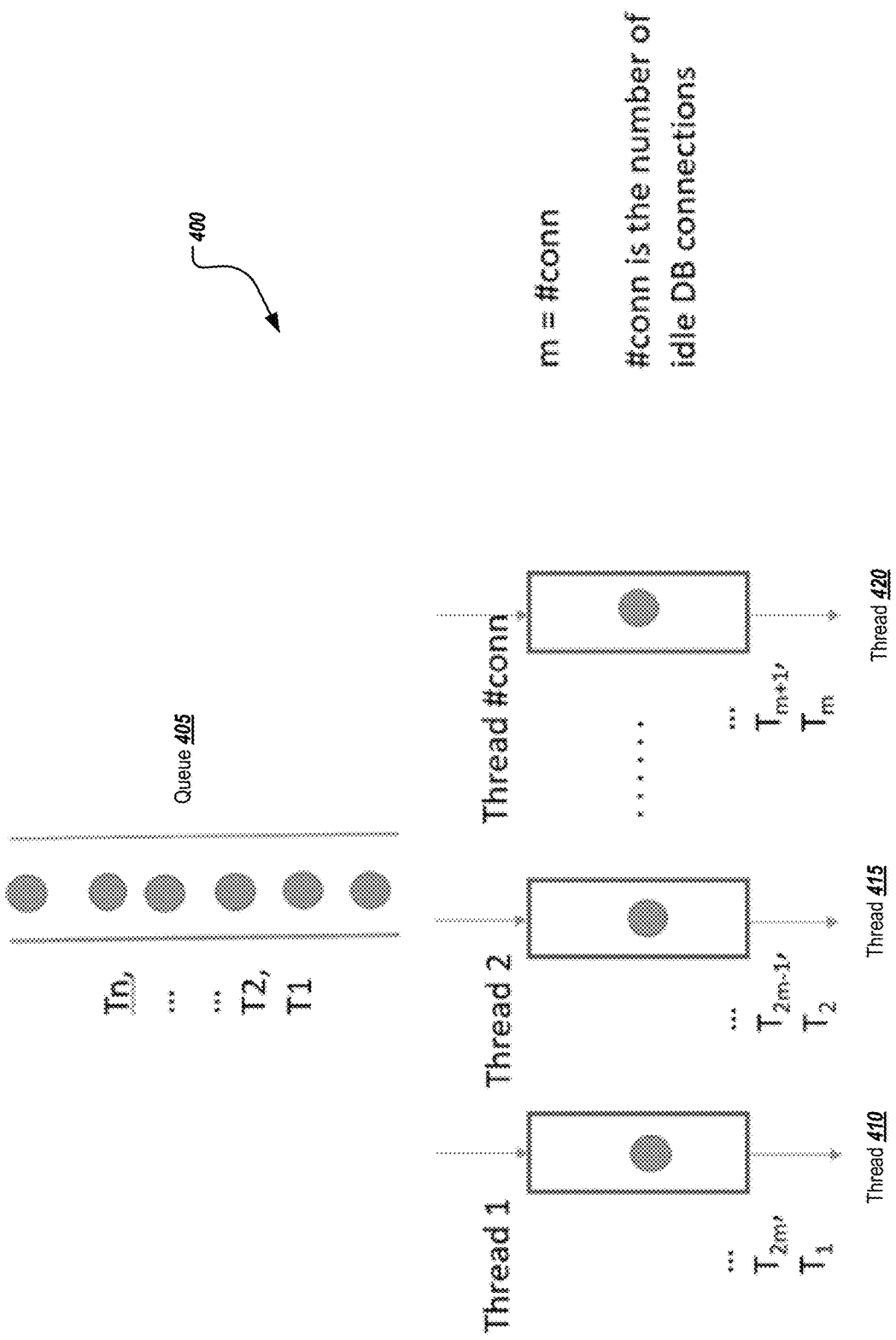
FIG. 4 is an example illustration of a workflow for concurrent thread metadata refresh where #conn is less than or equal to C in the one or more systems performing the refreshing.

FIG. 4 is an example illustration 400 of a workflow for concurrent thread metadata refresh where the idle number of database connections, #conn, is less than or equal to the number of CPU cores, C, in the one or more systems performing the refreshing. Because the system is limited by the number of connections that are available for refreshing the modules, the number of threads are set to the highest possible number of database connections, #conn. Similar to FIG. 3, a queue 405 of prioritized metadata modules is created. A number of threads, such as example threads 410, 415, and 420, numbering equal to #conn are instantiated, with the relatively highest priority metadata modules being initially provided to those example threads 410, 415, and 420.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by at least one processor executing instructions, the method comprising:

identifying a set of metadata modules associated with one or more entities, the metadata modules defining metadata associated with a particular data model for the associated entities;

identifying a request to initiate a refreshing of the metadata for a subset of the set of metadata modules;

prioritizing each metadata module from the subset of the set of metadata modules into a prioritization order;

determining whether two or more idle database connections are available; and in response to determining that two or more idle database connections are available, initiating a concurrent refresh of the subset of the set of metadata modules in the prioritization order, wherein initiating the concurrent refresh of the subset of the set of metadata modules comprises:

determining a CPU core number, C, of a particular set of servers to perform the refresh;

determining a number of idle database connections, #CONN, at the particular set of servers;

in response to determining that C is less than or equal to #CONN, performing a concurrent refresh of the subset of the set of metadata modules using #CONN threads at the particular set of servers; and in response to determining that C is greater than #CONN, performing a concurrent refresh of the subset of the set of metadata modules using C+1 threads at the particular set of servers.

2. The method of claim 1, further comprising, in response to determining that only one idle database connection is available, initiating a single thread refresh of the subset of the set of metadata modules.

3. The method of claim 2, wherein the single thread refresh of the set of metadata modules comprises a sequential processing of metadata modules in the subset of the set of metadata modules.

4. The method of claim 1, further comprising, prior to determining whether two or more idle database connections are available:

determining whether a set of system resource metrics satisfy a concurrent refresh threshold; and in response to determining the set of system resource metrics do not satisfy the concurrent refresh threshold, initiating a single thread refresh of the subset of the set of metadata modules.

5. The method of claim 4, wherein the concurrent refresh threshold includes at least one of a particular current CPU usage amount threshold and a current available memory threshold, wherein the current available memory threshold represents an available memory greater than the required memory associated with the concurrent refresh.

6. The method of claim 1, wherein the request to initiate a refreshing of the metadata for a subset of the set of metadata modules comprises one of:

a manual request by a particular user to initiate the refreshing of the metadata;

an automatic request to initiate the refreshing of the metadata in response to the expiration of a cache associated with the metadata modules;

an automatic request to initiate the refreshing of the metadata in response to a determination that at least one entity associated with at least one of the metadata modules has been updated; and an automatic request to initiate the refreshing of the metadata in response to a determination that at least one new entity is newly added.

7. The method of claim 1, wherein prioritizing each metadata module from the subset of the set of metadata modules into a prioritization order comprises prioritizing the metadata modules in a descending order based on an average refresh time for each of the metadata modules.

8. The method of claim 7, wherein at least one metadata module in the subset of the set of metadata modules is associated with a relatively higher priority, the relatively higher priority distinct from the average refresh time of the at least one metadata module, wherein the at least one metadata module is provided a relatively higher priority in the prioritization order than metadata modules having a relatively longer average refresh time than the at least one metadata module.

9. The method of claim 7, wherein the average refresh time for each metadata module is calculated based on metrics calculated for a predetermined number of prior refresh times for each metadata module.

10. A system comprising:
at least one processor; and
a memory communicatively coupled to the at least one processor, the memory storing instructions which, when executed, cause the at least one processor to perform operations comprising:
identifying a set of metadata modules associated with one or more entities, the metadata modules defining metadata associated with a particular data model for the associated entities;
identifying a request to initiate a refreshing of the metadata for a subset of the set of metadata modules;
prioritizing each metadata module from the subset of the set of metadata modules into a prioritization order;
determining whether two or more idle database connections are available; and
in response to determining that two or more idle database connections are available, initiating a concurrent refresh of the subset of the set of metadata modules in the prioritization order, wherein initiating the concurrent refresh of the subset of the set of metadata modules comprises:
determining a CPU core number, C, of a particular set of servers to perform the refresh;
determining a number of idle database connections, #CONN, at the particular set of servers;
in response to determining that C is less than or equal to #CONN, performing a concurrent refresh of the subset of the set of metadata modules using #CONN threads at the particular set of servers; and
in response to determining that C is greater than #CONN, performing a concurrent refresh of the subset of the set of metadata modules using C+1 threads at the particular set of servers.

11. The system of claim 10, the operations further comprising, in response to determining that only one idle database connection is available, initiating a single thread refresh of the subset of the set of metadata modules.

12. The system of claim 11, wherein the single thread refresh of the set of metadata modules comprises a sequential processing of metadata modules in the subset of the set of metadata modules.

13. The system of claim 10, the operations further comprising, prior to determining whether two or more idle database connections are available:
determining whether a set of system resource metrics satisfy a concurrent refresh threshold, wherein the concurrent refresh threshold includes at least one of a particular current CPU usage amount threshold and a current available memory threshold, wherein the current available memory threshold represents an available memory greater than the required memory associated with the concurrent refresh; and
in response to determining the set of system resource metrics do not satisfy the concurrent refresh threshold, initiating a single thread refresh of the subset of the set of metadata modules.

14. The system of claim 10, wherein the request to initiate a refreshing of the metadata for a subset of the set of metadata modules comprises one of:
a manual request by a particular user to initiate the refreshing of the metadata;
an automatic request to initiate the refreshing of the metadata in response to the expiration of a cache associated with the metadata modules;
an automatic request to initiate the refreshing of the metadata in response to a determination that at least one entity associated with at least one of the metadata modules has been updated; and
an automatic request to initiate the refreshing of the metadata in response to a determination that at least one new entity is newly added.

15. The system of claim 10, wherein prioritizing each metadata module from the subset of the set of metadata modules into a prioritization order comprises prioritizing the metadata modules in a descending order based on an average refresh time for each of the metadata modules, wherein at least one metadata module in the subset of the set of metadata modules is associated with a relatively higher priority, the relatively higher priority distinct from the average refresh time of the at least one metadata module, wherein the at least one metadata module is provided a relatively higher priority in the prioritization order than metadata modules having a relatively longer average refresh time than the at least one metadata module.

16. A non-transitory computer-readable medium storing instructions which, when executed, cause at least one processor to perform operations comprising:
identifying a set of metadata modules associated with one or more entities, the metadata modules defining metadata associated with a particular data model for the associated entities;
identifying a request to initiate a refreshing of the metadata for a subset of the set of metadata modules;
prioritizing each metadata module from the subset of the set of metadata modules into a prioritization order;
determining whether two or more idle database connections are available; and
in response to determining that two or more idle database connections are available, initiating a concurrent refresh of the subset of the set of metadata modules in the prioritization order, wherein initiating the concurrent refresh of the subset of the set of metadata modules comprises:
determining a CPU core number, C, of a particular set of servers to perform the refresh;
determining a number of idle database connections, #CONN, at the particular set of servers;
in response to determining that C is less than or equal to #CONN, performing a concurrent refresh of the subset of the set of metadata modules using #CONN threads at the particular set of servers; and
in response to determining that C is greater than #CONN, performing a concurrent refresh of the subset of the set of metadata modules using C+1 threads at the particular set of servers.

17. The medium of claim 16, the operations further comprising, in response to determining that only one idle database connection is available, initiating a single thread refresh of the subset of the set of metadata modules, wherein the single thread refresh of the set of metadata modules comprises a sequential processing of metadata modules in the subset of the set of metadata modules.

18. The medium of claim 16, the operations further comprising, prior to determining whether two or more idle database connections are available:

determining whether a set of system resource metrics satisfy a concurrent refresh threshold, wherein the concurrent refresh threshold includes at least one of a particular current CPU usage amount threshold and a current available memory threshold, wherein the current available memory threshold represents an available memory greater than the required memory associated with the concurrent refresh; and in response to determining the set of system resource metrics do not satisfy the concurrent refresh threshold, initiating a single thread refresh of the subset of the set of metadata modules.

* * * * *